United States Patent
Borowski et al.

(10) Patent No.: US 11,188,068 B2
(45) Date of Patent: Nov. 30, 2021

(54) MONITORING OF AN OPERATIONAL PROCESS USING A FAULT PREDICTION MODEL

(71) Applicant: Robert Bosch GmbH, Stuttgart (DE)

(72) Inventors: Fabian Borowski, Commerce Twp., MI (US); James Kressler, Nazareth, PA (US); Uwe Roehm, Granger, IN (US); Stefan Reichardt, Anderson, SC (US); Luis Alonso Loya Acosta, Juarez (MX); Edgar Baur, Mt. Pleasant, SC (US)

(73) Assignees: Robert Bosch LLC, Broadview, IL (US); Robert Bosch GmbH, Stuttgart (DE)

( * ) Notice: Subject to any disclaimer, the term of this patent is extended or adjusted under 35 U.S.C. 154(b) by 164 days.

(21) Appl. No.: 16/360,621

(22) Filed: Mar. 21, 2019

(65) Prior Publication Data

US 2020/0301407 A1 Sep. 24, 2020

(51) Int. Cl.
*G05B 23/02* (2006.01)

(52) U.S. Cl.
CPC ..... *G05B 23/0283* (2013.01); *G05B 23/0232* (2013.01); *G05B 23/0272* (2013.01)

(58) Field of Classification Search
CPC ............ G05B 23/0232; G05B 23/0216; G05B 23/0272; G05B 23/0283

USPC .................................................. 702/183, 185
See application file for complete search history.

(56) References Cited

U.S. PATENT DOCUMENTS

| | | | | |
|---|---|---|---|---|
| 9,122,253 | B2* | 9/2015 | Block | G06F 11/008 |
| 9,547,291 | B2* | 1/2017 | Tran | G06F 8/38 |
| 9,551,633 | B2* | 1/2017 | Mazzaro | G05B 23/0283 |
| 9,599,982 | B2* | 3/2017 | Tran | G05B 23/0272 |
| 10,254,754 | B2* | 4/2019 | McCann | G05B 23/027 |
| 2013/0174111 | A1* | 7/2013 | Durkan | G06F 30/398 |
| | | | | 716/112 |
| 2018/0373234 | A1* | 12/2018 | Khalate | G05B 23/0221 |
| 2019/0018400 | A1* | 1/2019 | McCann | B33Y 10/00 |
| 2019/0339221 | A1* | 11/2019 | Bhavaraju | G01N 27/3274 |
| 2020/0225132 | A1* | 7/2020 | Harshbarger | G05B 19/4063 |
| 2020/0301408 | A1* | 9/2020 | Elbsat | G05B 23/0291 |

\* cited by examiner

*Primary Examiner* — John H Le
(74) *Attorney, Agent, or Firm* — David Kovacek; Maginot, Moore & Beck LLP

(57) ABSTRACT

A monitoring system and method for monitoring an operational operation to predict a fault in the operational operation. The operational operation monitors a number of manufacturing stages within a manufacturing system. The monitoring is accomplished using a number of sensors directed to measuring aspects of the manufacturing system, and detecting trends indicating a potential fault of the system according to a prediction model. The prediction model may be updated during online operation of the monitoring system.

19 Claims, 2 Drawing Sheets

MONITORING OF AN OPERATIONAL PROCESS USING A FAULT PREDICTION MODEL

TECHNICAL FIELD

This disclosure relates to a system and method of operational analysis, and in particular utilization of the system and method in the context of a manufacturing process to improve the operational efficiency of the manufacturing process.

BACKGROUND

Advanced operational analysis is a time-consuming and expensive task that is useful for enhancing the efficiency of systems having one or more automated operations. Operational analysis can be used to determine more efficient methodologies of systems used in industrial applications, manufacturing processes, operation processes, coordinated enterprises, delivery services, and other fields of endeavor relying heavily on operational assessment.

Machine-based models may provide efficient analysis of operational trends during operation of systems. Currently, machine-based models rely upon analysis compiled by data scientists during an offline mode of operation to provide improvements to the systems being analyzed. Reliance upon data scientists to make adjustments to a model in an offline mode increases costs and slows the rate of the machine-based model to be used for operational analysis.

SUMMARY

One aspect of this disclosure is directed to a manufacturing monitoring system having a fault prediction function. The manufacturing monitoring system may comprise a number of sensors operable to measure a manufacturing aspect and generate corresponding sensor data, a process in data communication with the sensors, a datastore in data communication with the processor, and a human-machine interface in data communication with the processor and operable to receive feedback data from a user of the system. The processor may further be operable to generate a fault prediction based upon an analysis of the sensor data and the feedback data using a prediction model. The processor may further be operable to modify the prediction model based upon received feedback data. The human-machine interface may further be operable to receive indications of predictions from the processor, and permit the user to view histories of sensor data, feedback data, or indications. The sensors may be operable to measure aspects of manufacturing assets, such as machines, materials, tools, or components. The number of sensors may be operable to measure the aspects of manufacturing assets at one or more stages of the manufacturing process.

Another aspect of this disclosure is directed to a non-transitory computer-readable medium comprising executable instructions stored thereon that when read by a processor cause the processor to monitor a manufacturing process. The monitoring of the manufacturing process may comprise directing a number of sensors to measure at least one aspect of the manufacturing process, receiving the sensor data by a processor, generating a fault prediction in response to an analysis of the sensor data using a prediction model. In response to predicting a fault of the manufacturing aspect, an indication may be sent to a human-machine interface. The processor may receive feedback data from the human-machine interface, and the processor may utilize the feedback data to update the prediction model.

A further aspect of this disclosure is directed to directed to a method of monitoring a manufacturing process. The monitoring of the manufacturing process may comprise directing a number of sensors to measure at least one aspect of the manufacturing process, receiving the sensor data by a processor, generating a fault prediction in response to an analysis of the sensor data using a prediction model. In response to predicting a fault of the manufacturing aspect, an indication may be sent to a human-machine interface. The processor may receive feedback data from the human-machine interface, and the processor may utilize the feedback data to update the prediction model.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
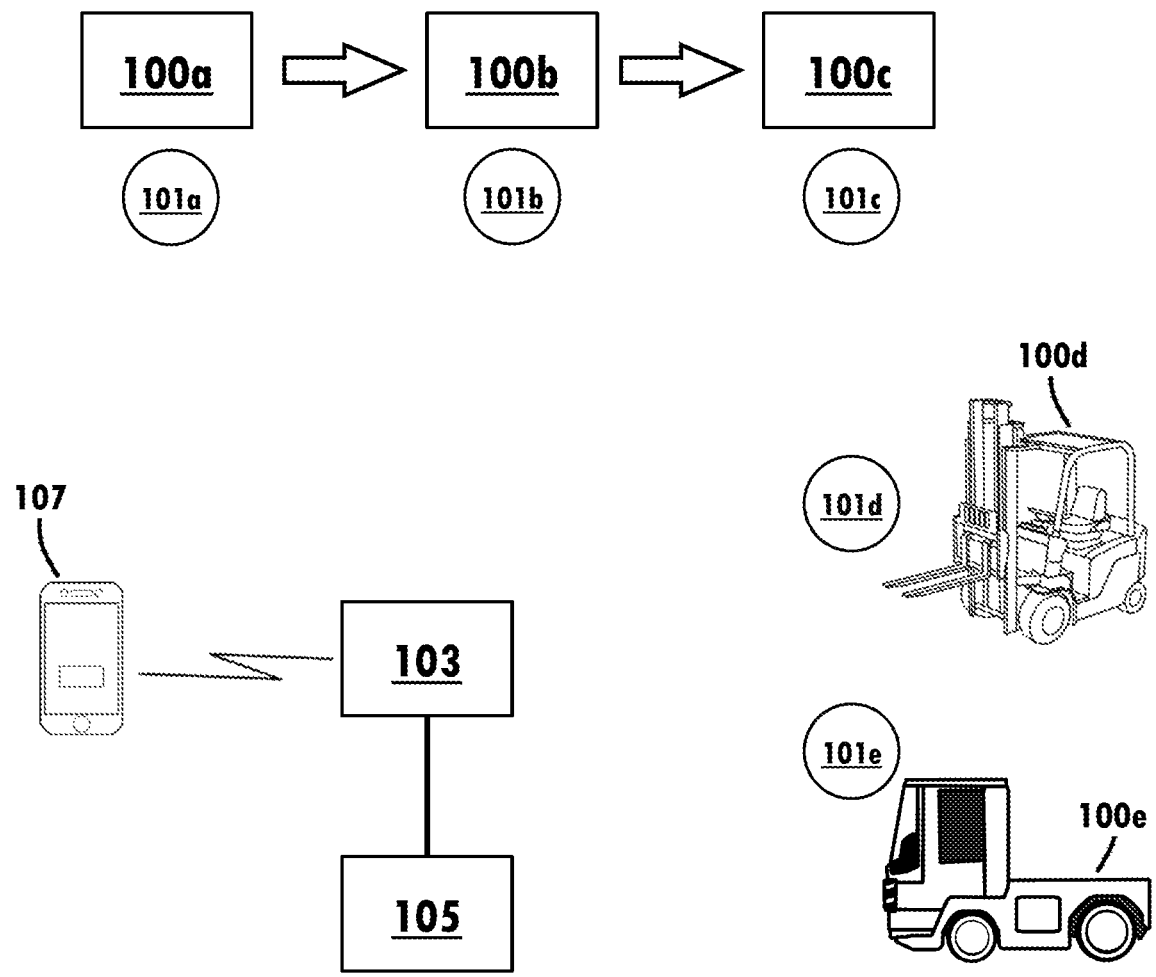
FIG. 1 is a diagrammatic illustration of an operations monitoring system within a manufacturing environment.

FIG. 1 a diagrammatic view of a monitoring system according to one embodiment of the teachings disclosed herein. In the depicted embodiment, the monitoring system may be operable to monitor a manufacturing process. Other embodiments may be operable to monitor other processes with operational variables, such as inventory management, industrial operations, automated chemical composition, or any other operational operation known to one of ordinary skill in the art without deviating from the teachings disclosed herein.

In the depicted embodiment, the monitoring system may be operable to monitor a manufacturing system having a number of manufacturing assets 100 during manufacturing process. Manufacturing assets may comprise elements of the manufacturing process, such as tools, automated devices, components, materials, supplemental equipment, or other assets of a manufacturing process known to one of ordinary skill in the art without deviating from the teachings disclosed herein. In the depicted embodiment, manufacturing assets 100 comprise manufacturing device 100a, manufacturing device 100b, manufacturing device 100c, forklift 100d, and material transport 100e, but other embodiments may comprise other configurations having a different set of manufacturing assets without deviating from the teachings disclosed.

The manufacturing monitoring system may further comprise a number of sensors 101, each of the sensors associated with at least one manufacturing aspect of the manufacturing system. A manufacturing aspect may comprise a condition of a manufacturing aspect or a component of a manufacturing asset. A manufacturing aspect may comprise an operative behavior of a manufacturing asset. A manufacturing aspect may comprise a condition of an article of manufacture during the manufacturing product. A manufacturing aspect may comprise a particular condition or operation of a manufacturing asset or article of manufacture at a particular stage of the manufacturing process.

Each of the number of sensors of the manufacturing monitoring system may be operable to measure one or more manufacturing aspects of the manufacturing system. A sensor may be operable to measure physical conditions of a manufacturing aspect, article of manufacture, of the environment of the manufacturing system, such as temperature, humidity, vibration, component wearing, magnetization, pulse, pressure, radiation, light, voltage, current, or gravity conditions. A sensor may be operable to measure an operational behavior of a manufacturing asset or article of manufacture such as material consumption, flow rate, energy consumption or dynamic behavior. A sensor may be operable to detect a particular condition of a manufacturing asset or an article of manufacture such as material quality, product quality, machine quality, component quality, or object quality with respect to specified limits of the manufacturing asset or article of manufacture. A sensor may be operable to measure operational errors or malfunctions experienced by a component of the monitoring system or the manufacturing system. Operational errors or malfunctions may be the result of user errors, component errors, machine errors, product errors, tool errors, interface errors, calibration errors, setup errors, installation errors, software errors, process errors, program errors, hardware errors, firmware errors, update errors, or handling errors. A sensor may be operable to measure the operational behaviors of a manufacturing asset with respect to specified limits of the manufacturing asset, such as a production rate, scrap rate, first yield pass rate, reinsertion rate, yield counts, or a length of down time.

The monitoring system may further comprise a processor 103 in data communication with each of the sensors 101, and operable to received sensor data from each of the sensors 101 for analysis. Processor 103 may be operable to store and retrieve data from a datastore 105. Datastore 105 may also store a prediction model that is usable by processor 103 in analyzing the sensor data to predict potential faults of the manufacturing system. The monitoring system may further comprise a human-machine interface (HMI) 107 in data communication with processor 103 and operable to provide a user indication of system operational behavior, provide a history of received data, and permit the user to generate feedback data that may be utilized by processor 103 to adjust operation of the monitoring system. In the depicted embodiment, the sensor data received from sensors 101 and feedback data received from HMI 107 may be utilized by processor 103 to adapt the prediction model during operation of the monitoring system. Online adaptation of the prediction model may advantageously reduce the cost and time necessary to improve the analytic operations of processor 103 by eliminating the need for external analysis of the results by a data scientist. The downtime of the manufacturing system may further be advantageously minimized by utilizing online adaptation of the prediction model by avoiding the need to replace the prediction model during an offline mode of the monitoring system. Online adaptation of the prediction model may further advantageously reduce costs of the monitoring system by permitting the initial prediction model to conform to a generalized prediction model, without requiring extensive testing over time to fine-tune the prediction model to suit the particular operation of the manufacturing system.

By way of example, and not limitation, manufacturing asset 100a may comprise a molder operable to mold raw material into a predefined shape, manufacturing asset 100b may comprise a driller operable to drill threaded holes into the shaped materials, and manufacturing asset 100c may comprise a joiner operable to screw the shaped materials together using the drilled holes. In the depicted embodiment, an article of manufacture may flow between manufacturing assets 100a, 100b, and 100c in sequence, such as along an automated conveyor belt. Forklift 100d may be operable to provide raw materials to molder 100a. Material transport 100e may be operable to retrieve finished articles of manufacture from joiner 100c and transport the articles to another location.

Sensors 101 may each be associated with a different stage of the manufacturing process. In the depicted embodiment, sensor 101a may be operable to measure a manufacturing aspect pertaining to molder 100a. Sensor 101b may be operable to measure a manufacturing aspect pertaining to driller 100b. Sensor 101c may be operable to measure a manufacturing aspect pertaining to joiner 100c. Sensor 101d may be operable to measure a manufacturing aspect pertaining to forklift 100d. Sensor 101e may be operable to measure a manufacturing aspect pertaining to material transport 100e. In some embodiments, each of sensors 101 may comprise a multi-functional sensor, a sensor array, or a plurality of distinct sensors generating sensor data pertaining to an associated manufacturing aspect without deviating from the teachings disclosed herein. Other embodiments may have other configurations without deviating from the teachings disclosed herein.

Each of the sensors measures their respective associated manufacturing aspect and generates sensor data that is received by processor 103. Processor 103 analyzes the sensor data for trends that may indicate a fault according to the prediction model. If processor 103 finds a trend that indicates a fault prediction is appropriate, an indication of the fault prediction may be sent to HMI 107. A user of the monitoring system may then generate feedback data either validating the fault prediction or invalidating the fault prediction. For example, if sensor 101c transmits data indicating that the rate of joining articles of manufacture has slowed to below a threshold value, the prediction model may indicate that the drilling component of driller 100b is not properly drilling the holes used for joining. A user may receive an indication of this fault prediction, and inspect the operation of driller 100b to confirm whether this fault is correct. If the fault prediction is deemed accurate, the user generates feedback data indicating such and the prediction model may be updated to reflect that this fault prediction was accurate for future analyses. If the fault prediction is deemed inaccurate, the user generates corresponding feedback data and the prediction model may be updated to reflect the inaccuracy so that future analyses are less likely to result in this prediction. In this manner, the prediction model may be adapted over time to fine-tune the accuracy of fault prediction for the particular manufacturing process.

In some embodiments, one or more of sensors 101 may be operable to generate data that may be analyzed to determine conditions pertaining to more than one manufacturing aspect without deviating from the teachings disclosed herein. For example, sensor data pertaining to a cutting element may comprise measurements of the wear condition of the cutting element, a measurable quality of cuts in the article of manufacture, and the speed with which the cutting element engages and disengages from the article of manufacture. In another example, a camera sensor directed to an article of manufacture after a cutting phase may provide data that is useful to determine discoloration of the article of manufacture, evenness of the cutting operation, and whether the cutting produced an article of manufacture having dimensions within the specified threshold tolerances.

Other sensors may be utilized in secondary manufacturing aspects that do not directly pertain to the articles of manufacture but still have an impact on the manufacturing process. By way of example, and not limitation, sensor 101*e* may be operable to determine a level of fuel available for material transport 100*e*. Even though the operation of material transport 100*e* has no direct effect on the quality of the articles of manufacture produced during the manufacturing process, it is still undesirable for material transport 100*e* to be rendered inoperable because that would impede the ability of other elements of the manufacturing system to continue to output completed articles.

The prediction model may advantageously utilize a multi-faceted analysis to determine a fault prediction. Such a multi-faceted approach may track a number of correlated manufacturing aspects, including manufacturing aspects that may provide an indirect indication of a potential fault. In one example, if it is known that the drilling bit of driller 100*b* is specified to tolerate 1000 operational cycles before failure, processor 103 may be operable to count the number of drilling operations, but may also track other related manufacturing aspects, such as the speed of the drilling operation, or the number of articles produced by joiner 100*c*. This may advantageously provide additional data that may yield accurate predictions of a fault that help compensate for any measurement errors produced by a single sensor. In another example, the speed of operation of joiner 100*c* may fall below a specified threshold indicating a potential fault with driller 100*b*, such as reduced efficacy caused by wear and tear of the drilling bit. However, if the feedback data generated indicates that this is an incorrect fault, the prediction model may indicate that the issues may be caused by a different fault within the manufacturing system, such as molder 100*a* producing molded articles that have dimensions that are not within a necessary tolerance. This indication may provide a user of the system with a useful prediction of a fault even if molder 100*a* is still producing articles within the specified tolerances of that stage of manufacture. In this example, the monitoring system may advantageously provide indications of faults that only arise in situations where specified tolerances of other stages of manufacture may not have been properly specified for proper operation of a different stage of manufacture.

In the depicted embodiment, processor 103 may be embodied as a specialized processor, but other embodiments may comprise a mobile processing device, a smartphone, a tablet computer, a laptop computer, a wearable computing device, a desktop computer, a personal digital assistant (PDA) device, a handheld processor device, a specialized processor device, a system of processors distributed across a network, a system of processors configured in wired or wireless communication, or any other alternative embodiment known to one of ordinary skill in the art.

Processor 103 may operate according to executable computer-readable instructions. Computer-readable instructions may include instructions and data which cause a general purpose computer, special purpose computer, or special purpose processing device to perform a certain function or group of functions. Computer-readable instructions may also include program modules that are executed by computers in stand-alone or network environments. Program modules may include routines, programs, objects, components, or data structures that perform particular tasks or implement particular abstract data types. Computer-readable instructions, associated data structures, and program modules represent examples of the program code means for executing steps of the methods disclosed herein. The particular sequence of such executable instructions or associated data structures represents examples of corresponding acts for implementing the functions described in such steps. Such instructions may be stored upon a memory, such as datastore 105.

Datastore 105 may be embodied as a non-transitory computer-readable storage medium or a machine-readable medium for carrying or having computer-executable instructions or data structures stored thereon. Such non-transitory computer-readable storage media or machine-readable medium may be any available media embodied in a hardware or physical form that can be accessed by a general purpose or special purpose computer. By way of example, and not limitation, such non-transitory computer-readable storage media or machine-readable medium may comprise random-access memory (RAM), read-only memory (ROM), electrically erasable programmable read-only memory (EEPROM), optical disc storage, magnetic disk storage, linear magnetic data storage, magnetic storage devices, flash memory, or any other medium which can be used to carry or store desired program code means in the form of computer-executable instructions or data structures. Combinations of the above should also be included within the scope of the non-transitory computer-readable storage media or machine-readable medium.

In the depicted embodiment. HMI 107 is depicted as a smartphone, but other embodiments may comprise other interfaces without deviating from the teachings disclosed herein. Other embodiments may comprise a tablet computer, a laptop computer, a wearable computing device, a desktop computer, a personal digital assistant (PDA) device, a handheld processor device, a specialized processor device, a system of processors distributed across a network, a system of processors configured in wired or wireless communication, or any other alternative embodiment known to one of ordinary skill in the art. In some embodiments, HMI 107 may comprise a user-interface for processor 103 without deviating from the teachings disclosed herein. In some embodiments, a monitoring system may comprise a plurality of HMIs 107 of similar or distinct types without deviating from the teachings disclosed herein.

In the depicted embodiment, a history of received sensor data, received feedback data, indications of fault predictions, and other operational data may be stored within datastore 105 and accessed by the processor 103 for presentation to the user using HMI 107. Other embodiments may comprise only some or none of these features without deviating from the teachings disclosed herein.

Figure 2:
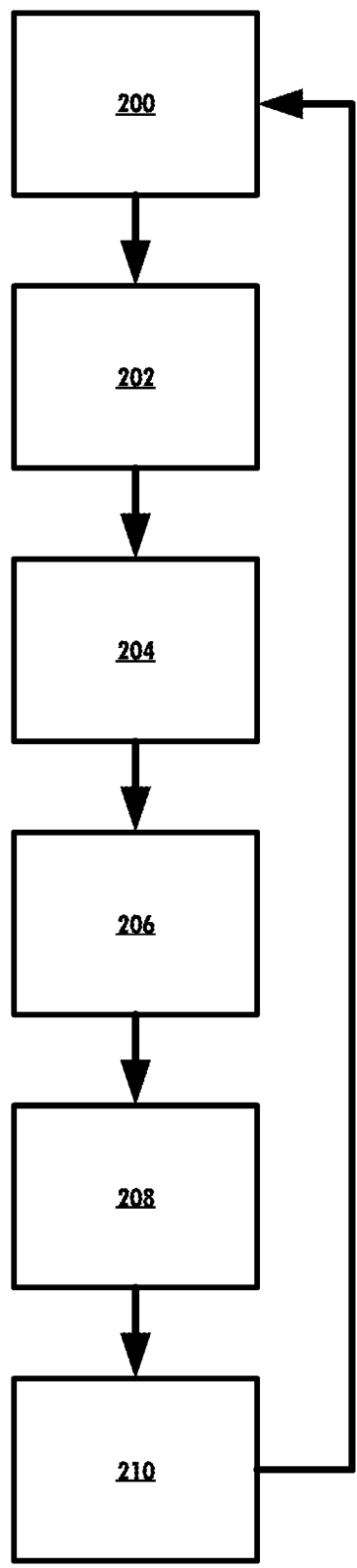
FIG. 2 is a flowchart illustrating a method of operating an operations monitoring system.

FIG. 2 illustrates a flowchart of a method of operating a monitoring system according to an embodiment of the teachings disclosed herein. The method starts at step 200, where a processor directs a number of sensors to measure aspects of one or more manufacturing assets to generate sensor data. At step 202, the sensor data is received by the processor and recorded for analysis. In some embodiments, the sensor data may not be stored, or may be stored only temporarily without deviating from the teachings disclosed herein. At step 204, the stored data is analyzed with respect to a prediction model for trends that may indicate a fault prediction for one or more of the manufacturing aspects, and a corresponding prediction is generated. In the event that no fault is predicted, a prediction of "no fault" or "normal operation" may be generated instead. In some embodiments, a fault prediction may not be generated unless a fault is predicted without deviating from the teachings disclosed herein.

An indication of the current operational status of the manufacturing system is transmitted to a human-machine interface at step 206. In response to the indication, the system receives and records feedback data verifying the validity of the fault prediction at step 208. Feedback data may be generated in response to an automated calculation (such as a confidence value), or may be generated in response to user input without deviating from the teachings disclosed herein. In some embodiments, the feedback data may not be stored, or may only be temporarily stored without deviating from the teachings disclosed herein.

After the feedback data is received, the method proceeds to step 210, where the sensor data and feedback data are utilized to update the prediction model used to predict faults. In some embodiments, the prediction model may only be updated in response to one of a verification or invalidation of the fault prediction from step 204 without deviating from the teachings disclosed herein. After updating the prediction model, the method returns to step 200 to continue the process. In the depicted embodiment, prediction model is updated without taking the processor offline, but other embodiments may comprise other steps without deviating from the teachings disclosed herein. In some embodiments, an ending condition may be utilized to stop the method from returning to step 200 without deviating from the teachings disclosed herein.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A manufacturing monitoring system having a fault-prediction function, the system comprising:
   a number of sensors operable to measure a manufacturing aspect associated with a manufacturing asset and generate corresponding sensor data;
   a processor in data communication with the number of sensors, and operable to receive the sensor data;
   a datastore in data communication with the processor, the datastore comprising a prediction model stored thereon; and
   a human-machine interface in data communication with the processor and operable to receive feedback data during operation of the monitoring system, the feedback data comprising data received from a user and data generated in response to an automated calculation,
   wherein the datastore is further operable to store the sensor data and the feedback data, wherein the processor is operable to generate a fault prediction predicting a fault in the manufacturing aspect according to the prediction model, wherein the human-machine interface is operable to provide an indication of the corresponding fault prediction, wherein the processor is operable to transfer the feedback data responding to the indication into the feedback history, wherein the processor is further operable to generate the fault prediction in response to detected trends in the sensor data and the feedback data, and wherein the processor is operable to update the prediction model in response to receiving the feedback data.

2. The manufacturing monitoring system of claim 1, wherein the number of sensors comprises a plurality of sensors, and the sensor data comprises a plurality of sets of sensor data, wherein each of the plurality of sensors is operable to generate a set of sensor data.

3. The manufacturing monitoring system of claim 2, wherein the plurality of sensors are operable to measure an environmental condition of a manufacturing asset and a component of a manufacturing asset.

4. The manufacturing monitoring system of claim 1, wherein the human-machine interface is in wireless data communication with the processor.

5. The manufacturing monitoring system of claim 4, wherein the human-machine interface comprises a smart phone or a tablet computing device.

6. The manufacturing monitoring system of claim 4, wherein the human-machine interface is operable to enable a user to navigate and inspect the stored sensor data, the feedback history, and a history of fault predictions.

7. The manufacturing monitoring system of claim 1, wherein the number of sensors are operable to measure conditions of the operation of the manufacturing asset and conditions of the resulting article of manufacture during at least one stage of manufacture corresponding to an operation of the manufacturing asset.

8. A non-transitory computer-readable medium comprising executable instructions stored thereon that when read by a processor cause the processor to monitor a manufacturing process, the monitoring comprising:
   directing a number of sensors in data communication with the processor to measure at least one aspect of the manufacturing process associated with a manufacturing asset and generate corresponding sensor data;
   receiving the sensor data from the number of sensors;
   recording the sensor data into a datastore in data communication with the processor;
   generating a fault prediction predicting a fault in the manufacturing aspect in accordance with a prediction model stored upon the datastore;
   transmitting an indication of the fault prediction to a human-machine interface;
   receiving feedback data from the human-machine interface generated in response to the indication of the fault prediction;
   recording the feedback data into the datastore; and
   updating the prediction model in response to the recorded feedback data,
   wherein the aspect of the manufacturing process comprises at least one of a condition of a manufacturing asset during a stage of the manufacturing process, and wherein the fault prediction is generated in response to detection of a trend in at least one of the sensor data and the feedback data corresponding to a trend correlated to a fault associated with the manufacturing aspect in the prediction model.

9. The non-transitory computer-readable medium of claim 8, further comprising instructions stored thereon wherein the fault prediction is generated in response to detection of a trend in both the sensor data and the feedback data.

10. The non-transitory computer-readable medium of claim 9, wherein the fault prediction is generated in response to detection of a trend in the sensor data that is correlated to a trend in the feedback data.

11. The non-transitory computer-readable medium of claim 8, wherein the transmitting an indication of the fault prediction and the receiving feedback data each comprise utilizing a wireless data channel to communicate with the human-machine interface.

12. The non-transitory computer-readable medium of claim 8, further comprising instructions stored thereon that when read by a processor cause the processor to perform the steps of:
   transmitting to the human-machine interface the sensor data, feedback data, or a history of fault predictions.

13. A method to monitor a manufacturing process, the method comprising:
   directing a number of sensors to measure at least one manufacturing aspect of the manufacturing process and generate corresponding sensor data;
   receiving the sensor data from the number of sensors;
   recording the sensor data into a datastore in data communication with the processor;
   generating a fault prediction predicting a fault in the manufacturing aspect in accordance with a prediction model stored in the datastore;
   transmitting an indication of the fault prediction to a human-machine interface;
   receiving feedback data generated in response to the indication of the fault prediction, the feedback data comprising data received from a user and data generated in response to an automated calculation;
   recording the feedback data into the datastore;
   updating the prediction model in response to the recorded feedback data,
   wherein the aspect of the manufacturing process comprises at least one of a condition of a manufacturing asset or a condition of an article of manufacture during a stage of the manufacturing process, and wherein the fault prediction is generated in response to detection of a trend in at least one of the sensor data and the feedback data corresponding to a trend correlated to a fault in the prediction model.

14. The method of claim 13, wherein the transmitting an indication of the fault prediction and the receiving feedback data each comprise utilizing a wireless data channel to communicate with the human-machine interface.

15. The method of claim 13, further comprising transmitting to the human-machine interface the sensor data, feedback data, or a history of fault predictions in response to a command received in the feedback data.

16. The method of claim 13, wherein the manufacturing aspect comprises a condition of a manufacturing asset and a condition of an article of manufacture during a stage of the manufacturing process.

17. The method of claim 13, wherein the manufacturing aspect comprises a plurality of conditions of manufacturing asset during a stage of the manufacturing process.

18. The method of claim 13, wherein the aspect of the manufacturing process comprises a plurality of conditions of the article of manufacturing during a stage of the manufacturing process.

19. The method of claim 13, wherein the aspect of the manufacturing process comprises a plurality of aspects, each aspect comprising a condition of a manufacturing asset or a condition of the article of manufacture during a stage of the manufacturing process, and wherein at least two of the plurality of aspects correspond to different stages of the manufacturing process.

* * * * *

UNITED STATES PATENT AND TRADEMARK OFFICE
CERTIFICATE OF CORRECTION

PATENT NO. : 11,188,068 B2
APPLICATION NO. : 16/360621
DATED : November 30, 2021
INVENTOR(S) : Borowski et al.

Page 1 of 1

It is certified that error appears in the above-identified patent and that said Letters Patent is hereby corrected as shown below:

In the Claims

In Claim 17, at Column 10, Lines 22-23: "conditions of manufacturing asset" should read --conditions of a manufacturing asset--.

Signed and Sealed this
First Day of March, 2022

Drew Hirshfeld
*Performing the Functions and Duties of the*
*Under Secretary of Commerce for Intellectual Property and*
*Director of the United States Patent and Trademark Office*